US006965703B1

(12) United States Patent
Regev

(10) Patent No.: US 6,965,703 B1
(45) Date of Patent: Nov. 15, 2005

(54) OPTICAL SCANNER AND SOFTWARE FOR CORRECTING DISTORTED IMAGES

(75) Inventor: Reuven Regev, Haifa (IL)

(73) Assignee: Topscan Ltd., Tel Aviv (IL)

( * ) Notice: Subject to any disclaimer, the term of this patent is extended or adjusted under 35 U.S.C. 154(b) by 0 days.

(21) Appl. No.: 09/869,926

(22) PCT Filed: Jan. 6, 2000

(86) PCT No.: PCT/IL00/00010

§ 371 (c)(1), (2), (4) Date: Nov. 7, 2001

(87) PCT Pub. No.: WO00/41128

PCT Pub. Date: Jul. 13, 2000

(30) Foreign Application Priority Data

Jan. 7, 1999 (IL) .................................... 127958
Nov. 3, 1999 (IL) .................................... 132719

(51) Int. Cl.[7] ................................................ G06K 9/40

(52) U.S. Cl. ...................... 382/275; 382/286; 382/313; 358/3.26; 358/473

(58) Field of Search ................................ 382/185, 187, 382/200, 260, 274, 275, 252, 107, 112, 286, 382/290, 291, 292, 313; 358/1.2, 3.26, 3.27, 358/448, 463, 1.11, 505, 473

(56) References Cited

U.S. PATENT DOCUMENTS

| | | | | |
|---|---|---|---|---|
| 5,023,922 | A | | 6/1991 | Abramovitz et al. |
| 5,083,218 | A | | 1/1992 | Takasu et al. |
| 5,506,918 | A | * | 4/1996 | Ishitani ....................... 382/289 |
| 5,581,633 | A | | 12/1996 | Hotta et al. |
| 5,638,466 | A | * | 6/1997 | Rokusek ..................... 382/290 |
| 5,854,853 | A | * | 12/1998 | Wang ......................... 382/176 |
| 5,999,666 | A | * | 12/1999 | Gobeli et al. ............... 382/313 |
| 6,036,094 | A | * | 3/2000 | Goldman et al. ...... 235/462.45 |
| 6,064,779 | A | * | 5/2000 | Neukermans et al. ....... 382/313 |

FOREIGN PATENT DOCUMENTS

| | | |
|---|---|---|
| EP | 0 279 655 | 8/1988 |
| EP | 0 680 005 | 11/1995 |

* cited by examiner

*Primary Examiner*—Bhavesh M. Mehta
*Assistant Examiner*—Yosef Kassa
(74) *Attorney, Agent, or Firm*—Browdy and Neimark, PLLC

(57) ABSTRACT

The invention provides a scanner for scanning a surface having a one-dimensional optical sensor and no mechanical moving parts for determining the scanning speed. A method is also provided for processing a text image obtained by scanning a text with a scanner, where the text image is distorted due to variability of the instantaneous scanning speed. The method utilizes the mode character height and font ration for each font in the text obtaining a local correction factor at each location in the text image. The correction factor is related to the instantaneous scanning speed at the location and is used to correct the distorted text image.

17 Claims, 9 Drawing Sheets

BEGINNING

FIRST CONTINUATION

SECOND CONTINUATION

OPTICAL SCANNER AND SOFTWARE FOR CORRECTING DISTORTED IMAGES

REFERENCE TO RELATED APPLICATIONS

The present application is the national stage under 35 U.S.C. 371 of international application PCT/IL00/00010, filed 6 Jan. 2000 which designated the United States, and which international application was published under PCT Article 21(2) in the English language.

FIELD OF THE INVENTION

The present invention is in the field of text scanners and software for use therewith.

BACKGROUND OF THE INVENTION

Hand-held optical scanners are used in a variety of applications including text scanning, barcode reading, and picture grabbing. These scanners comprise an optical sensor for acquiring image information that is managed by a central processing unit (CPU) and stored in a memory. The information is typically processed by character recognition software and then sent to a user application such as a word processor, database or spreadsheet.

The viewing area of hand-held scanners at a given it includes only a small portion of the entire scanned medium. Thus in use, a hand-held scanner is made to pass over the entire scanned medium so as to produce a time series of acquired images where each acquired image corresponds to a small portion of the scanned medium. Since the images are acquired at a constant rate, subsequent reconstruction of the scanned medium from the series of acquired images produces a distorted image due to variation in the scanning speed during scanning. A hand held scanner has a reference scanning speed at which the acquired image is identical to the original. The reference scanning speed is the product of the width (in the scanning direction) of the optical sensor and the rate at which images are acquired by the sensor. Locations in the scanned medium acquired when the scanning speed is below the reference speed appear to be stretched or expanded, while locations acquired when the scanning speed is above the reference speed appear compressed. Such distorted images may not be recognizable by character recognition software. Each acquired image must thus be processed by rescaling it in the scanning direction by a correction factor equal to the instantaneous scanning speed divided by the reference speed. Prior art scanners therefore comprise means for continuously monitoring the instantaneous scanning speed. U.S. Pat. No. 5,083,218, for example, discloses a hand-held scanner comprising a wheel that rolls along the scanned medium during scanning for measuring the instantaneous speed at every moment during the scanning. U.S. Pat. No. 5,023,922 discloses a hand-held scanner with a 2-dimensional optical sensor in which the instantaneous speed is calculated from the time interval required for an image to traverse the sensor. The presence of a wheel or a two dimensional sensor makes the hand held scanner bulky and awkward to use.

There is therefore a need in the art to provide a scanner that substantially reduces or overcomes the disadvantages of prior art scanners.

Glossary

There follows a glossary of terms used in the following description and set of claims together with their definitions, some of them known in the art, others having been coined.

Field of view—the portion of the scanned medium acquired by a scanner at one instant.

Scanned image—a two-dimensional image created by moving a scanner over a surface. The scanned image is compiled from the time series of fields of view acquired during scanning.

Text image—A scanned image composed of text in any language.

Cluster—A contiguous group of black pixels in a text image. A black cluster is typically a single character but may be a portion of a single character, or a union of two or more characters.

Horizontal segment—A line of contiguous black pixels parallel to the text line, one pixel high. The length of a horizontal segment is the number of its black pixels.

Stack—A contiguous array of at least a predetermined number of horizontal segments in a scanned image with the following properties:

(a) No two of the horizontal segments are collinear.

(b) The ratio of the length of the longest horizontal segment in the stack to that of the shortest horizontal segment does not exceed a predetermined value.

(c) adjacent horizontal segments in the stack at least partially overlap (i.e. in a given pair of adjacent horizontal segments in the stack, there is at least one black pixel in each of the two horizontal segments acquired from the same field of view).

Each stack has associated with it a height that may be defined, for example, as the number of its composite horizontal segments. Each stack also has associated with it a width that may be defined, for example, as the average length of its horizontal composite segments, the minimal length of its horizontal composite segments, or the length of an arbitrary one of its horizontal segments. The invention is not to be considered as being bound by these definitions, and other definitions of height and width are contemplated within the scope of the invention. Each stack also has associated with it a bounding rectangle of minimum dimensions in which two opposite sides are vertical and two opposite sides are horizontal.

Essentially vertical stack—A stack whose height exceeds a predetermined number in which the ratio of the width of the stack to the width of its bounding rectangle exceeds a predetermined value.

Character recognition software—Any software package for converting a text image into a string of ASCII characters, for example Optical Character Recognition (OCR) software.

Stop interval—A series of consecutive fields of view, the number of which exceed a predetermined number, all of which are nearly identical to the first field of view. Two fields of view are considered to be nearly identical if there does not exist in one of the fields of view a subfield of contiguous pixels of length greater than a predetermined length in which all of the pixels are different from the corresponding pixels in the other field of view.

Font ratio—the ratio of the mode character height (the most common character height) to the most common essentially vertical line width of the characters in a particular font. The font ratio is a characteristic constant of a given font. For most fonts, the font ratio is typically, although not necessarily, around 6.

Correction factor—the instantaneous scanning speed divided by the reference speed.

SUMMARY OF THE INVENTION

In the following description and set of claims, the direction of the text line as well as the scanning direction of a hand held scanner is arbitrarily designated as the horizontal direction. This designation is being made only for the sake of simplicity in describing the invention. Other scanning directions are also contemplated within the scope of the invention and the invention is not to be considered as being bound by this arbitrary designation.

In its first aspect, the present invention provides a scanner having a one-dimensional (linear) optical sensor that creates an image one pixel wide and n pixels in length (height), and not having mechanical moving parts such as a wheel. A series of scanned images is acquired at a constant rate determined by an internal clock inside the scanner when the scanner's sensor array is moved over a surface so as to scan a line of symbols. Image information obtained by the sensor may be stored and processed in a computer processing unit.

In its second aspect the present invention provides a method for determining the instantaneous correction factor of a text image during scanning by a hand held scanner. Since the instantaneous correction factor is equal to the instantaneous scanning speed divided by the reference speed of the scanner, the method is equivalent to a method for determining the instantaneous scanning speed. The method may be used with a scanner not having any mechanical moving parts. It may also be used with scanners having only a one-dimensional optical sensor. The method of the invention may be used for removing distortions in a text image due to variation in the scanning speed in order to make the text recognizable by optical character recognition software or readable as an image by a user.

The method of the invention is based upon the observation that in a scanned image, vertical distances (i.e. distances perpendicular to the scanning direction) at any particular location are independent of the instantaneous scanning speed at that location. In particular, in a text image, the height of a text character is independent of the scanning speed. The mode character height in a text image is therefore independent of any variability in the scanning speed during acquisition of the text image. As disclosed below, the instantaneous scanning velocity, or equivalently the instantaneous correction factor, at a location in a text image comprising an essentially vertical stack can be determined from the width of the essentially vertical stack, the mode character height of the scanned text, and the font ratio.

The invention thus provides a scanner for scanning a surface characterized in that it has a one-dimensional optical sensor and has no mechanical moving parts for determining the scanning speed.

The invention also provides a method for processing an acquired text image obtained by scanning a text with a scanner, the text having one or more fonts, each font having a font ratio, each location in the text having been scanned at an instantaneous scanning speed, where the text image is distorted due variability of the instantaneous scanning speed, the method comprising the following steps:

(a) Providing a mode character height for each font; and
(b) utilizing said mode character height and font ratio for constructing a correction factor in order to correct the distorted text image.

The invention further provides a storage medium storing an executable computer program for processing an acquired text image obtained by scanning a text with a scanner, the text having one or more fonts, each font having a font ratio, each location in the text having been scanned at an instantaneous scanning speed, where the text image is distorted due variability of the instantaneous scanning speed, the processing comprising the following steps:

(a) Providing a mode character height for each font; and
(b) utilizing said mode character height and font ratio for constructing a correction factor in order to correct the distorted text image.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
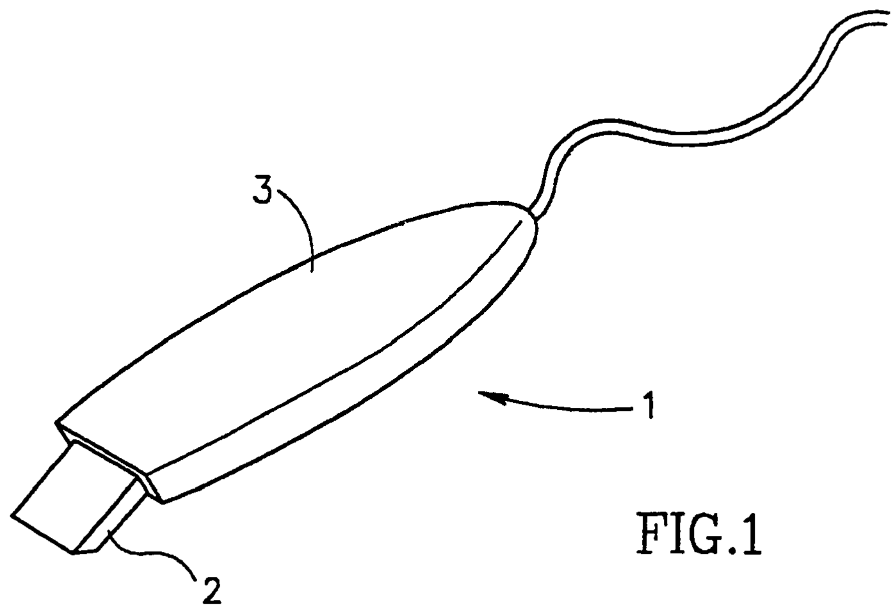
FIG. 1 shows a hand-held scanner according to the invention.
Figure 2:
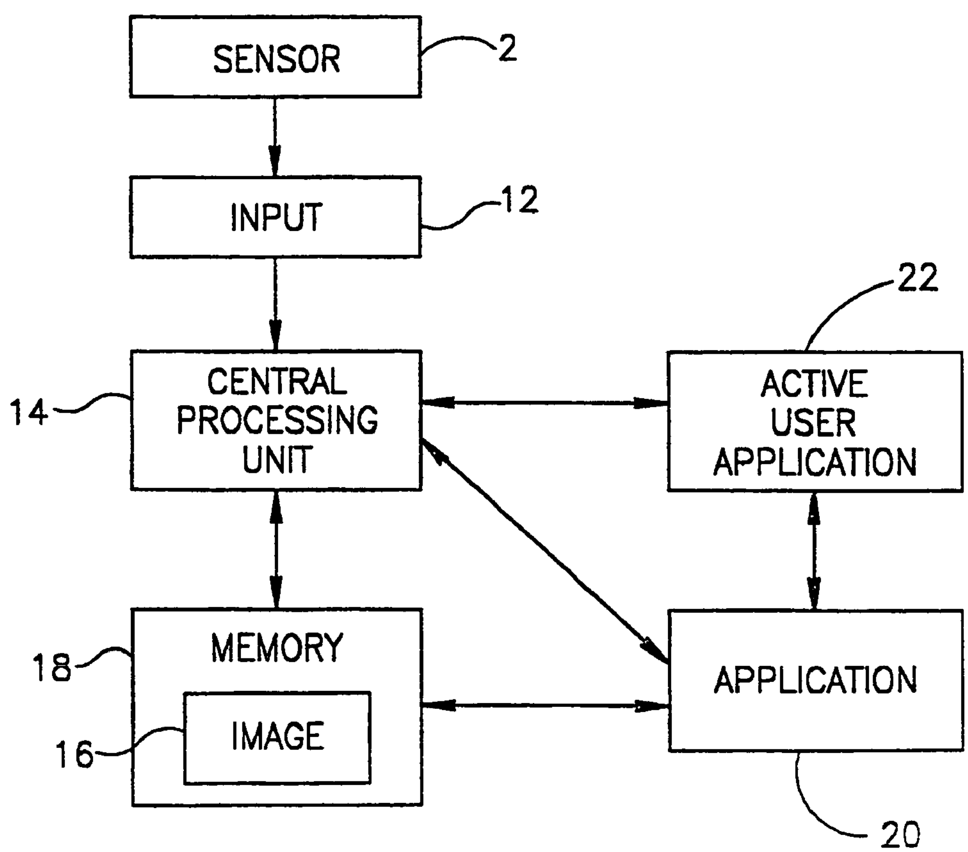
FIG. 2 shows a block diagram of the processing carried out according to the invention.

In its first aspect, the present invention provides a scanner having a one-dimensional optical sensor and not having mechanical moving parts such as a wheel. As shown in FIG. 1, the scanner, generally designated as 1, has a one-dimensional optical sensor 2, a handle 3 for grasping, and no mechanical moving parts. A series of scanned images is acquired by moving the sensor 2 over a surface. FIG. 2 is a block diagram of a system comprising a one-dimensional scanner and a processor according to the invention. The sensor 2 is used to scan a line of symbols. The sensor is linked to the input port of central processing unit 12. The input function is managed by a CPU 14. Image information 16 obtained by sensor 10 may be stored by the CPU in a memory 18. The structure of the system of the invention is not bound to the specific architecture depicted in FIG. 2.

In its second aspect the present invention provides a method for determining the instantaneous correction factor of a text image during scanning by a hand held scanner. The method may be used with a scanner not having any mechanical moving parts. It may also be used with scanners having only a one-dimensional optical sensor. The method of the invention may be used for removing distortions due to variation in the scanning speed in the text image 16 acquired by the sensor 2 in order to make the text recognizable by character recognition software or by a user. The method, to be described below in detail, is carried out by an application 20 that processes the image either in real time or off-line in respect of image a priori stored in memory 18. The results of the processing may optionally be processed by character recognition software before being returned to the CPU or sent to interface 22.

Figure 3:
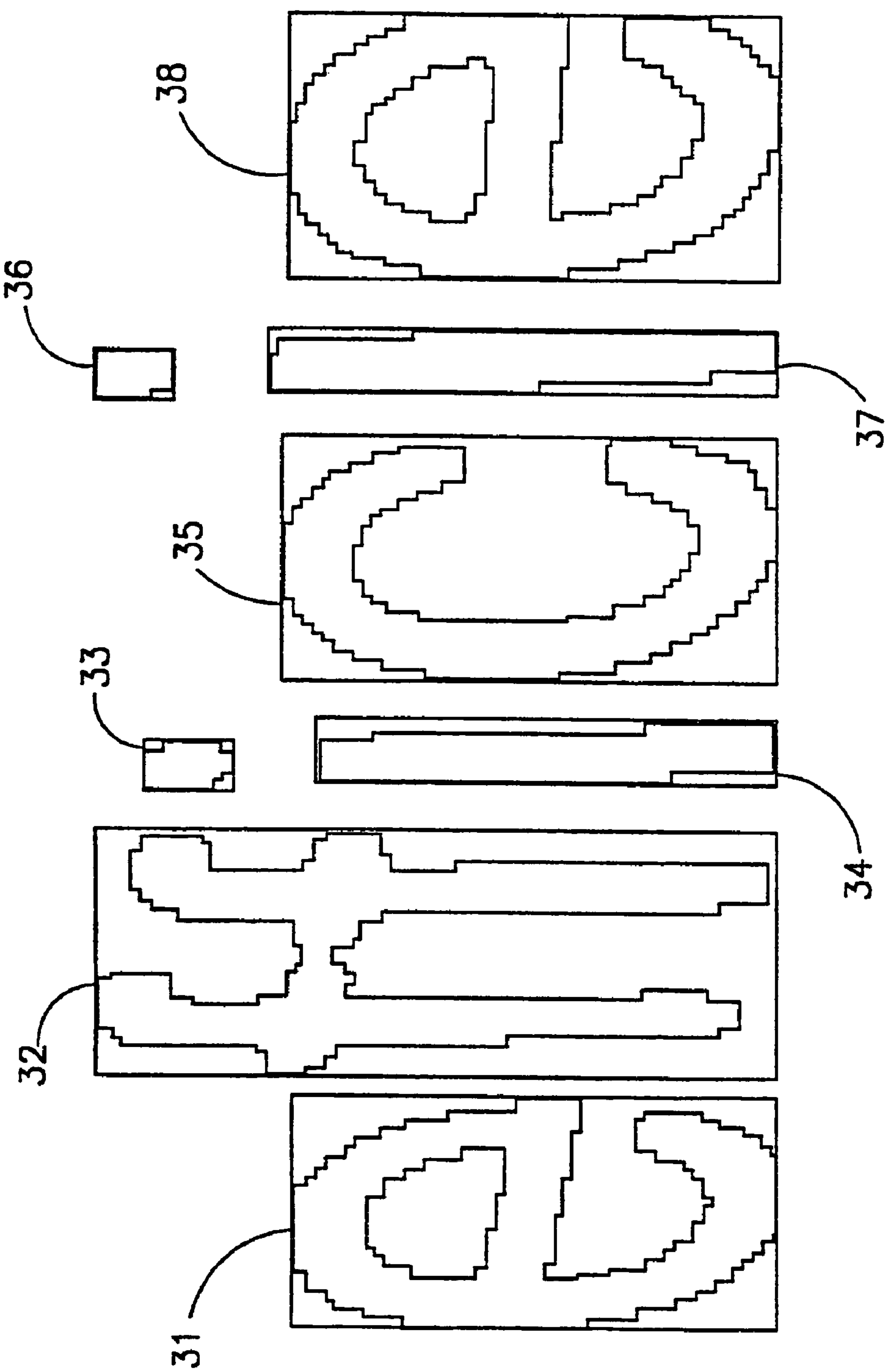
FIG. 3 shows 7 characters resolved into 8 clusters.

Referring now to FIG. 3, 7 characters are shown resolved into eight clusters. Clusters 31, 35 and 38 each form an entire character (e, c and e, respectively). Cluster 32 is a union of two characters (ff). Clusters 33, 34, 36 and 37 each contain a part of a character (i).

Figure 4A:
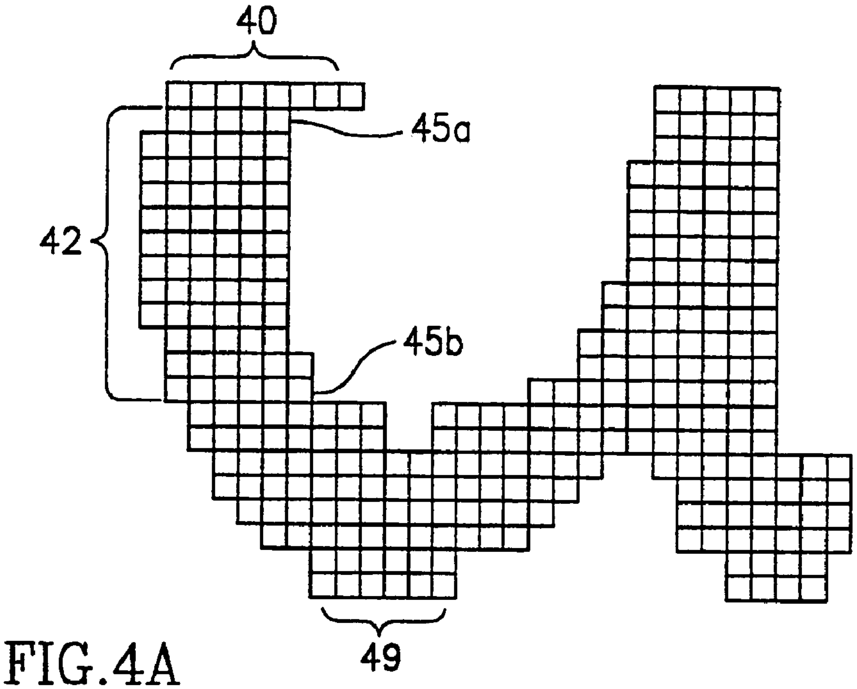
FIG. 4, *a* and *b* each show a cluster decomposed into horizontal segments.
Figure 4B:
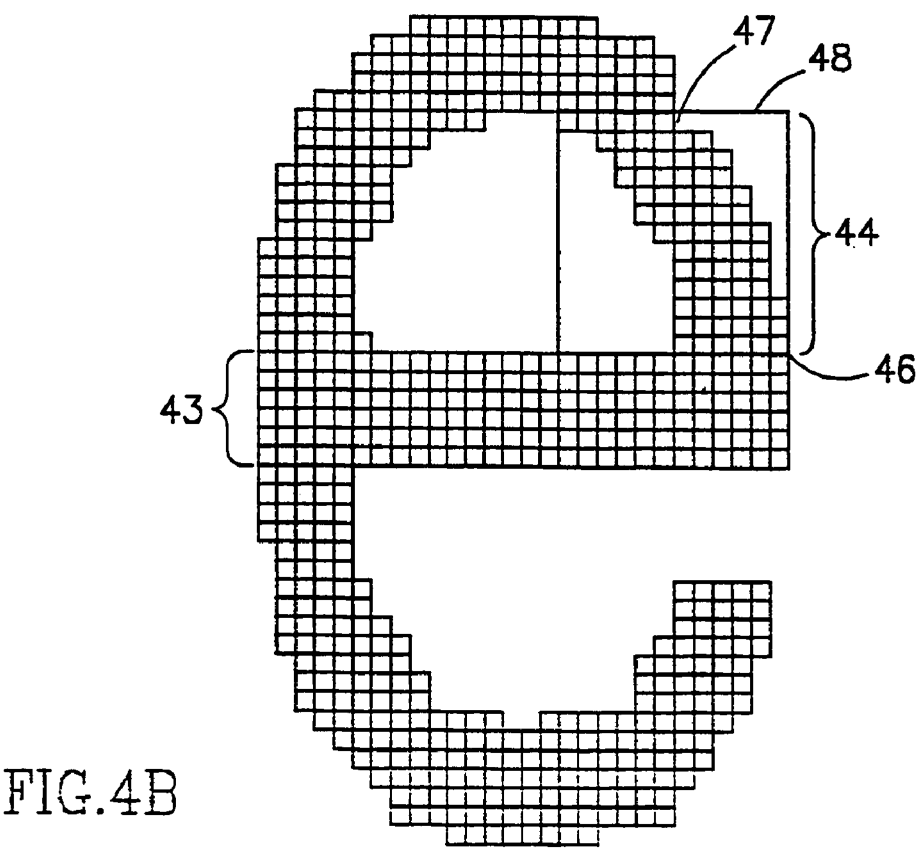

FIG. 4 shows two clusters divided into composite pixels. In FIG. 4*a*, horizontal line 49, for example, has a length of 6 (pixels), and horizontal line 40 has a length of 8. Stack 42 has a height of 12. If horizontal line 40 were to be added to stack 42, the resulting composite structure would not be a stack because the ratio of the length of the longest horizontal segment (8) to that of the shortest horizontal segment (5) in the structure would exceed a typical predetermined value of 1.3. Two of the twelve horizontal lines constituting stack 42 designated as 45*a* and 45*b* have a length of 5, while the other ten have a length of 6. The width of stack 42 (the average length of its horizontal lines) is thus calculated to be 5.83. In FIG. 4*b* stack 43 has a height of 6 and a width of 28, which is equal to the cluster width. Stack 43 is not considered to be an essentially vertical stack because its height does not exceed a typical predetermined value of about 8. Stack 44 is composed of 13 horizontal line segments of lengths of 5–6. In this stack, there is no overlap between the lowest 46 and highest 47 horizontal line segments. Stack 44 is also not an essentially vertical stack because the ratio of its width (6.3) to the width of its bounding rectangle 48 (12) does not exceed a typical predetermined value of about 0.75. The above mentioned predetermined values used in reference to the clusters of FIG. 4, are by way of example only, and the invention is not bound by these predetermined values.

Figure 5A:
FIG. 5*a* shows a line of text to be scanned.

FIG. 5*a* shows a line of text to be scanned. Arrows 56 indicate the mode character height, and arrows 57 show the most common vertical line width. In some fonts, essentially vertical lines are slightly slanted from a true vertical position. The ratio of the mode character height 56 to the most common essentially vertical line width 57 (the font ratio) is a characteristic constant of the font.

Figure 5B:
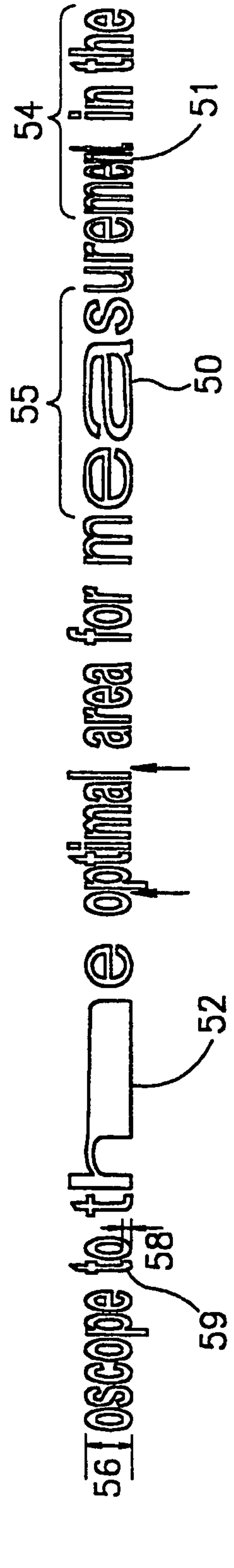
FIG. 5*b* shows a text image obtained by scanning the line of text of FIG. 5*a* with a hand-held scanner.

FIG. 5*b* shows a typical text image obtained by scanning the text line in FIG. 5*a* with a hand-held scanner. The text appears distorted due to variation in the scanning speed. Character widths are inversely proportional to the scanning speed. As can be seen by comparing the width of characters 50 and 51 in the original text (FIG. 5*a*) with their images in the text scan (FIG. 5*b*), in interval 54 the instantaneous scanning speed was greater than the reference speed of the scanner, while in interval 55 the instantaneous scanning speed was below the reference speed. Vertical line widths, for example that of vertical line 59, are also inversely proportional to the scanning speed. The mode character height 56, however, is unaffected by the variability in the scanning speed and is the same in FIGS. 5*a* and 5*b*. Horizontal line widths, for example that of line 58, are also unaffected by variations in scanning speed. Interval 52 is a typical stop segment.

Figure 6:
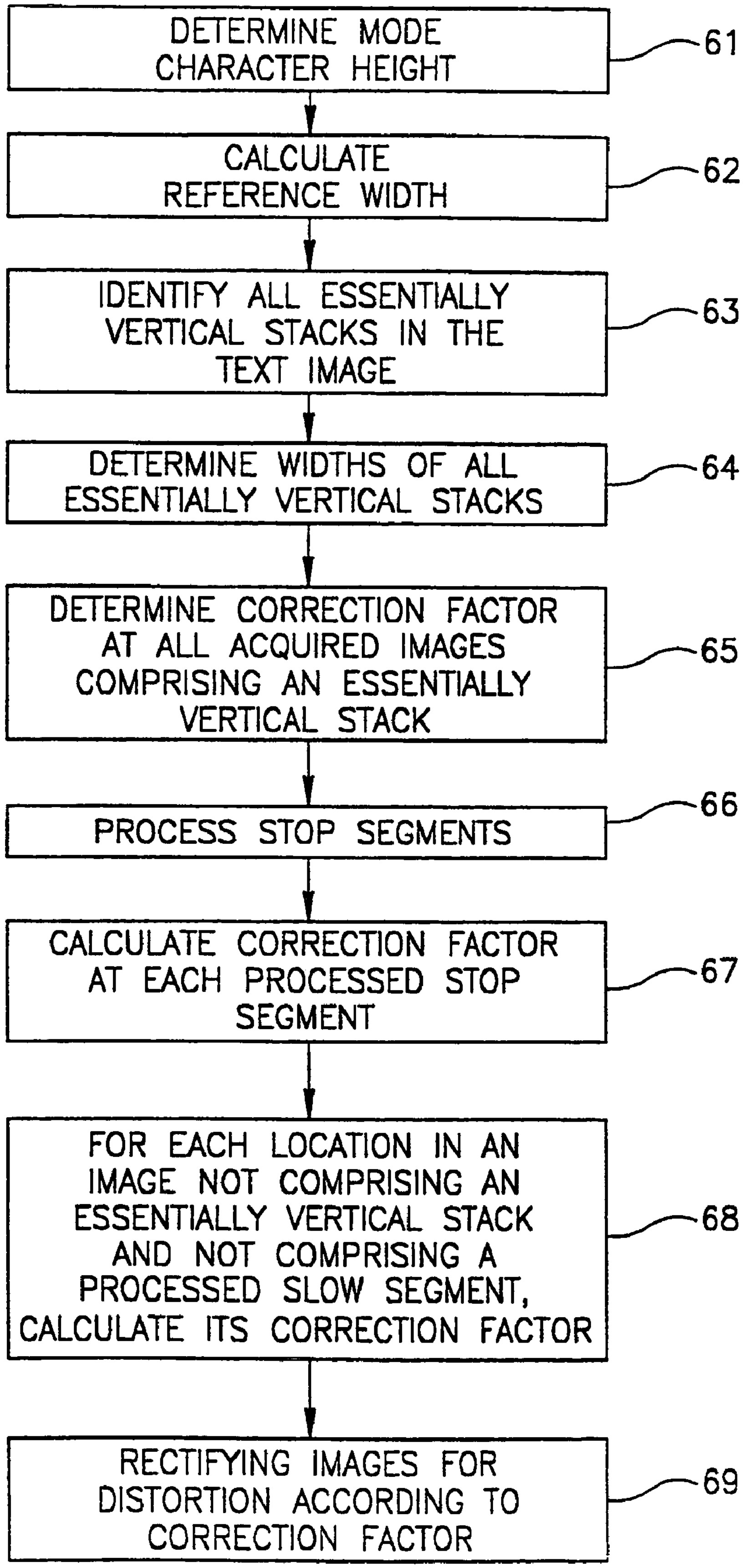
FIG. 6 shows a flow chart for determining the instantaneous scanning speed according to the invention.
Figure 7A:
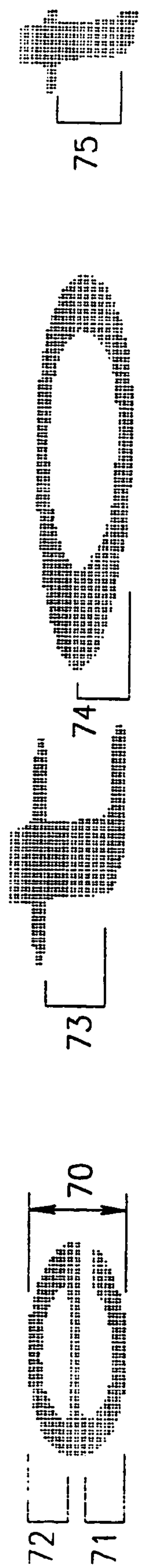
FIG. 7 *a–c* show parts of an acquired text image.
Figure 7B:
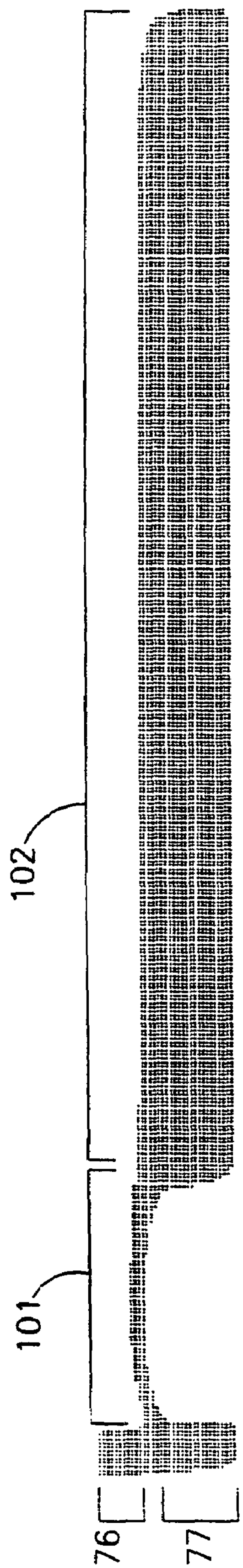
Figure 7C:
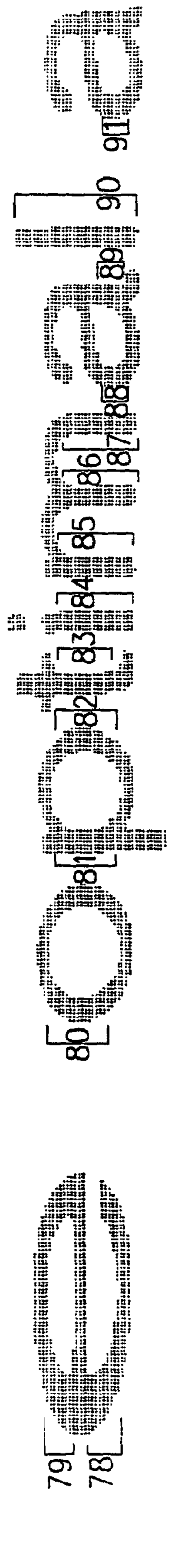

FIG. 6 shows a flow chart describing the method in accordance with one embodiment of the invention for determining the instantaneous correction factor at different locations in an acquired text image such as the one shown in FIG. 7. The font ratio for the font of the text from which the acquired text image shown in FIG. 7 was obtained is, by this example, about 6. The mode height of the text characters is determined 60, which, as stated above, is independent of any variability in the scanning speed. The mode character height of the acquired text shown in FIG. 7 is indicated by double arrow 70 and is equal, by this example, to 26 pixels. A reference width is calculated 61 which is equal to the mode character height divided by the font ratio. For the text image of FIG. 7, the reference width is thus calculated to be 26/6, or 4.3 pixels. Since the font ratio is defined as the ratio of the mode character height to the most common essentially vertical line width of the characters comprising the font, the reference width is the expected width of an essentially vertical stack when the scanning speed is equal to the reference speed. All essentially vertical stacks in the text image are then identified 63. Numerals 71–91 indicate all of the 21 essentially vertical stacks in FIG. 7. The widths of the essentially vertical stacks are determined 64. Essentially vertical stacks having a width greater than the reference width are those where the instantaneous scanning speed was below the reference speed of the scanner. Essentially vertical stacks having a width less than the reference speed are those where the instantaneous scanning speed was above the reference speed of the scanner. The correction factor at an image comprising an essentially vertical stack acquired when the scanning speed was below the reference speed is then obtained 65 by dividing the reference width by the width of the essentially vertical stack. For example, for essentially vertical stack 86, whose width is greater than the reference width, the correction factor is thus calculated to be 4.3/5.5, or 0.8. The correction factor at an image comprising an essentially vertical stack acquired when the scanning speed was above the reference speed is 1.

The invention also provides for determining the correction factor at a stop segment in an acquired text image. A stop segment 102 is seen in FIG. 7. In stop segment 102, all of the fields of view are nearly identical to the first field of view in the segment, which is indicative of a location in the acquired text image where the scanning speed was close to 0. Stop segment 102 is divided into a predetermined number of contiguous subsegments 66. In FIG. 7, stop segment 102 was divided into 4 subsegments. In each subsegment, at least one, but not all, of the consecutive fields of views is then deleted from the subsegment 67. For example, if all of the fields of view are deleted from each subsegment except for one, then stop segment 102 would appear as segment 802 in FIG. 8. The correction factor in a stop segment is a predetermined value, for example, 0.1, which indicates that the instantaneous scanning speed in the stop segment was very slow.

Reverting to FIG. 6, the correction factor at a location not comprising an essentially vertical stack and not comprising a stop segment that has been processed as above, is determined by one of the following methods 68. (i) Two essentially vertical stacks are found flanking the location on different sides. The correction factor is then determined at the location between the two essentially vertical stacks by interpolation of the correction factors at the two flanking essentially vertical stacks. (ii) Two stop segments are found flanking the location on different sides. The correction factor is then determined at the location between the two stop segments by interpolation of the correction factors at the two flanking stop segments. (iii) A stop segment and an essentially vertical stack are found flanking the location on different sides. The correction factor is then determined at the location between the stop segment and the essentially vertical stack by interpolation of the correction factors at the stop segment and the essentially vertical stack.

Figure 8:
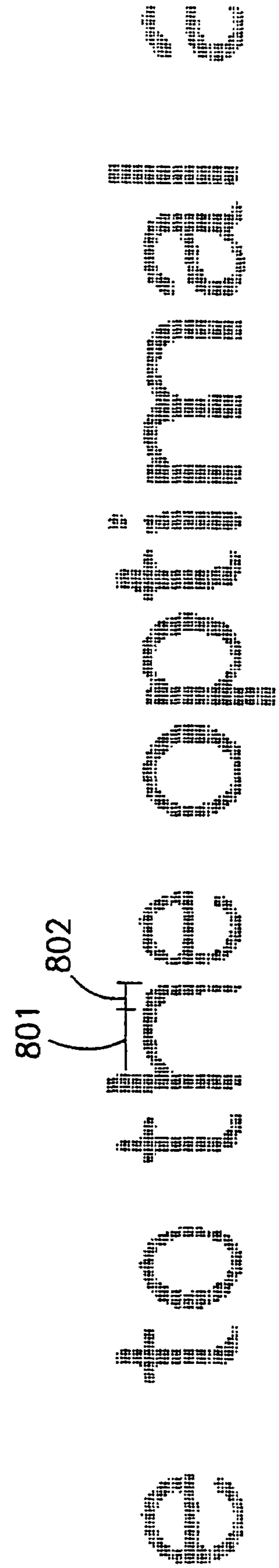
FIG. 8 shows the acquired text image of FIG. 7 after correction in accordance with the invention.

Once the correction factors during scanning of the text have been determined, the text image is rectified for distortions arising from variation in the scanning speed 69. This is accomplished by deleting fields of view at each location where the correction factor is less than one so as to achieve a resealing equal to the correction factor, as is known per se. When an essentially vertical stack is rectified in this way, it resembles the essentially vertical line in the text image which it represents in the scanned image. FIG. 8 shows the acquired text image shown in FIG. 7 after having been corrected.

While the invention has been described with a certain degree of particularity, it will be immediately apparent to those versed in the art that the method may be varied without departing from the scope of the invention. In particular, the order in which the steps of the method may be carried out may be changed without departing from the scope of the invention as defined in the following claims.

What is claimed is:

1. A method for processing an acquired text image obtained by scanning a text with a scanner, the text having one or more fonts, each font having a font ratio, each location in the text having been scanned at an instantaneous scanning speed, where the text image is distorted due to variability of the instantaneous scanning speed, the method comprising the following steps:

(a) providing a mode character height for each font; and (b) utilizing said mode character height and font ratio for constructing a correction factor in order to correct distortions in the text image due to scanning speed variations.

2. The method of claim 1 for determining the instantaneous correction factor at one or more essentially vertical stacks in an acquired text image, the essentially vertical stacks having widths, wherein said step (b) further includes utilizing the widths of one or more essentially vertical stacks in the acquired text image.

3. A method according to claim 2 comprising the steps of:

(a) determining the mode character height of the scanned text;

(b) calculating a reference line width by dividing the mode character height by the font ratio;

(c) determining the height and width of the one or more essentially vertical stacks;

(d) calculating an instantaneous correction factor for any one of the one or more essentially vertical stacks by dividing the reference width by the width of the essentially vertical stack to obtain the instantaneous correction factor at the essentially vertical stack; and (e) setting the correction factor equal to one when the correction factor calculated according to step (d) is greater than one.

4. The method of claim 3, further comprising the steps of:

(a) partitioning one or more stop segments into a predetermined number of subsegments of consecutive fields of view; and (b) deleting from each subsegment at least one, but not all, of the fields of view in the subsegment.

5. The method of claim 4 further comprising the step of calculating an instantaneous correction factor in one or more stop segments wherein the instantaneous correction factor in a stop segment is a predetermined value.

6. A method for calculating an instantaneous correction factor at a location in an acquired text image not comprising an essentially vertical stack and not comprising a stop segment that has been corrected according to the method of claim 5, wherein the method comprises either:

(a) identifying essentially vertical stacks flanking the location on different sides; calculating the instantaneous correction factor at each one of the two essentially vertical stacks by:

(i) providing a mode character height for each font; and (ii) utilizing said mode character height and font ratio for constructing a correction factor in order to correct distortions in the text image due to scanning speed variations, and calculating the instantaneous correction factor at said location by interpolation of the instantaneous correction factors of the essentially vertical stacks;

(b) identifying a subsegment in each of two stop segments flanking the location on different sides, calculating the instantaneous correction factor at each one of the two subsegments by the method of claim 5, and calculating the instantaneous correction factor at said location by interpolation of the instantaneous correction factors of the subsegments; or (c) identifying an essentially vertical stack and a subsegment of a stop segment flanking the location on different sides, calculating the instantaneous correction factor at the essentially vertical stack by:

(i) providing a mode character height for each font; and (ii) utilizing said mode character height and font ratio for constructing a correction factor in order to correct distortions in the text image due to scanning speed variations, calculating the instantaneous correction factor at the subsegment by the method of claim 5 and calculating the instantaneous correction factor at said location by interpolation of the instantaneous correction factors of the essentially vertical stack and the stop segment.

7. A method for removing distortions at one or more locations in an acquired text image due to variation in the scanning speed during scanning of a text, the method comprising the steps of:

(a) calculating the instantaneous correction factor at the one or more locations in the text image by the method of claim 2 and (b) deleting fields of view at each of the one or more locations where the correction factor is less than one so as to produce a rescaling of the acquired text image at each location by a factor substantially equal to the instantaneous correction factor at each location.

8. The method of claim 7 further comprising the step of processing the text image by character recognition software.

9. A system for processing a text comprising:

(a) a scanner having a one-dimensional optical sensor and no mechanical parts for determining scanning speed; and (b) a CPU coupled to a storage medium and executing software for carrying out the method according to claim 1.

10. A storage medium storing an executable computer program for processing an acquired text image obtained by scanning a text with a scanner, the text having one or more fonts, each font having a font ratio, each location in the text having been scanned at an instantaneous scanning speed, where the text image is distorted due variability of the scanning speed, the processing comprising the following steps:

(a) providing a mode character height for each font; and (b) utilizing said mode character height and font ratio for constructing a correction factor in order to correct distortions in the text image due to scanning speed variations.

11. The storage medium of claim 10 storing an executable computer program for determining the instantaneous correction factor at one or more essentially vertical stacks in an acquired text image, the essentially vertical stacks having widths, wherein said step (b) further includes utilizing the widths of one or more essentially vertical stacks in the acquired text image.

12. The storage medium according to claim 11 wherein the processing comprises the steps of:

(a) determining the mode character height of the scanned text;

(b) calculating a reference line width by dividing the mode character height by the font ratio;

(c) determining the height and width of the one or more essentially vertical stacks;

(d) calculating an instantaneous correction factor for any one of the one or more essentially vertical stacks by dividing the reference width by the width of the essentially vertical stack to obtain the instantaneous correction factor at the essentially vertical stack.

13. The storage medium of claim 12, wherein the processing further comprising the steps of:

(a) partitioning one or more stop segments into a predetermined number of subsegments of consecutive fields of view; and (b) deleting from each subsegment at least one, but not all, of the fields of view in the subsegment.

14. The storage medium of claim 13 wherein the processing further comprises calculating an instantaneous correction factor in one ore stop segments wherein the instantaneous correction factor for a stop segment is a predetermined value.

15. The storage medium of claim 14 wherein the processing further comprises calculating an instantaneous correction factor at a location in an acquired text image not comprising an essentially vertical stack and not comprising a subsegment of a stop segment that has been corrected, wherein the processing comprises either:

(a) identifying essentially vertical stacks flanking the location on different sides; calculating the instantaneous correction factor at each one of the two essentially vertical stacks by:

(i) providing a mode character height for each font; and (ii) utilizing said mode character height and font ratio for constructing a correction factor in order to correct distortions in the text image due to scanning speed variations, and calculating the instantaneous correction factor at said location by interpolation of the instantaneous correction factors of the essentially vertical stacks;

(b) identifying a subsegment in each of two stop segments flanking the location on different sides, calculating the instantaneous correction factor at each one of the two subsegments, and calculating the instantaneous correction factor at said location by interpolation of the instantaneous correction factors of the subsegments; or (c) identifying an essentially vertical stack and a subsegment of a stop segment flanking the location on different sides, calculating the instantaneous correction factor at the essentially vertical stack by:

(i) providing a mode character height for each font; and (ii) utilizing said mode character height and font ratio for constructing a correction factor in order to correct distortions in the text image due to scanning speed variations, calculating the instantaneous correction factor at the subsegment and calculating the instantaneous correction factor at said location by interpolation of the instantaneous correction factors of the essentially vertical stack and the stop segment.

16. A storage medium storing an executable computer program for processing an acquired text image to remove distortions at one or more locations in the acquired text image due to variation in the scanning speed during scanning of a text, the processing comprising the steps of:

(a) calculating the instantaneous correction factor at the one or more locations in the text image by the method of claim 1; and (b) deleting fields of view of each of the one or more locations where the correction factor is less than one so as to produce a resealing of the acquired text image at each location by a factor substantially equal to the instantaneous correction field at each location.

17. The storage medium of claim 16 for processing the text image by character recognition software.

* * * * *